(12) United States Patent
Lyon

(10) Patent No.: US 6,625,714 B1
(45) Date of Patent: Sep. 23, 2003

(54) PARALLEL DISTRIBUTED FUNCTION TRANSLATION LOOKASIDE BUFFER

(75) Inventor: Terry L Lyon, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/466,494

(22) Filed: Dec. 17, 1999

(51) Int. Cl.[7] .............................................. G06F 12/10
(52) U.S. Cl. ...................................... 711/207; 711/168
(58) Field of Search ........................... 711/3, 149–150, 711/154, 168, 205–207, 119, 141, 131, 144–145, 161–162; 712/221–222, 244; 708/445, 507

(56) References Cited

U.S. PATENT DOCUMENTS

| | | | | |
|---|---|---|---|---|
| 5,412,787 A | * | 5/1995 | Forsyth et al. | 711/207 |
| 5,644,748 A | * | 7/1997 | Utsunomiya et al. | 711/207 |
| 5,859,999 A | | 1/1999 | Morris et al. | 712/224 |
| 5,860,017 A | | 1/1999 | Sharangpani et al. | 712/23 |
| 6,047,354 A | * | 4/2000 | Yoshioka et al. | 711/118 |
| 6,272,597 B1 | * | 8/2001 | Fu et al. | 711/131 |
| 6,351,797 B1 | * | 2/2002 | Beard et al. | 711/207 |

FOREIGN PATENT DOCUMENTS

EP 0911737 * 4/1999

OTHER PUBLICATIONS

Wolfe, A., "Patents shed light on Merced's Innards", Electronic Engineering Times, Feb.15, 1999, pp. 43–44.

* cited by examiner

Primary Examiner—Matthew Kim
Assistant Examiner—Denise Tran

(57) ABSTRACT

In a computer system, a parallel, distributed function lookaside buffer (TLB) includes a small, fast TLB and a second larger, but slower TLB. The two TLBs operate in parallel, with the small TLB receiving integer load data and the large TLB receiving other virtual address information. By distributing functions, such as load and store instructions, and integer and floating point instructions, between the two TLBs, the small TLB can operate with a low latency and avoid thrashing and similar problems while the larger TLB provides high bandwidth for memory intensive operations. This mechanism also provides a parallel store update and invalidation mechanism which is particularly useful for prevalidated cache tag designs.

12 Claims, 4 Drawing Sheets

PARALLEL DISTRIBUTED FUNCTION TRANSLATION LOOKASIDE BUFFER

TECHNICAL FIELD

The technical field encompasses computer systems employing translation lookaside buffers for prevalidated cache tag designs.

BACKGROUND

Computer systems may employ a multi-level hierarchy of memory systems, with relatively fast, expensive but limited-capacity memory at the highest level of the hierarchy and proceeding to relatively slower, lower cost but higher-capacity memory at the lowest level of the hierarchy. The hierarchy may include a small fast memory called a cache, either physically integrated within a processor or mounted physically close to the processor for speed. The computer system may employ separate instruction caches and data caches. In addition, the computer system may use multiple levels of caches. The use of a cache is transparent to a computer program at the instruction level and can thus be added to a computer architecture without changing the instruction set or requiring modification to existing programs.

A cache hit occurs when a processor requests an item from a cache and the item is present in the cache. A cache miss occurs when a processor requests an item from a cache and the item is not present in the cache. In the event of a cache miss, the processor retrieves the requested item from a lower level of the memory hierarchy. In many processor designs, the time required to access an item for a cache hit is one of the primary limiters for the clock rate of the processor if the designer is seeking a single cycle cache access time. In other designs, the cache access time may be multiple cycles, but the performance of a processor can be improved in most cases when the cache access time in cycles is reduced. Therefore, optimization of access time for cache hits is critical for the performance of the computer system.

Associated with cache design is a concept of virtual storage. Virtual storage systems permit a computer programmer to think of memory as one uniform single-level storage unit but actually provide a dynamic address-translation unit that automatically moves program blocks on pages between auxiliary storage and the high speed storage (cache) on demand.

Also associated with cache design is the concept of a fully associative or content addressable memory (CAM). Content-addressable memory is a random access memory that in addition to having a conventional wired-in addressing mechanism also has wired-in logic that makes possible a comparison of desired bit locations for a specified match for all entries simultaneously during one memory-cycle time. Thus, the specific address of a desired entry need not be known since a portion of its contents can be used to access the entry. All entries that match the specified bit locations are flagged and can be addressed on the current or subsequent memory cycles.

Memory may be organized into words (for example, 32 bits or 64 bits per word). The minimum amount of memory that can be transferred between a cache and the next lower level of memory hierarchy is called a line or a block. A line may be multiple words (for example, 16 words per line). Memory may also be divided into pages or segments with many lines per page. In some computer systems page size may be variable.

In modern computer memory architectures, a central processing unit (CPU) produces virtual addresses that are translated by a combination of hardware and software to physical addresses. The physical addresses are used to access physical main memory. A group of virtual addresses may be dynamically assigned to each page. Virtual memory requires a data structure, sometimes called a page table, that translates the virtual address to the physical address. To reduce address translation time, computers may use a specialized associative cache dedicated to address location, called a translation lookaside buffer (TLB).

A cache may include many segments, or ways. If a cache stores an entire line address along with the data and any line can be placed anywhere in the cache, the cache is said to be fully associative. For a large cache in which any line can be placed anywhere, the hardware required to rapidly determine if and where an item is in the cache may be very large and expensive. For larger caches a faster, space saving alternative is to use a subset of an address (called an index) to designate a line position within the cache, and then store the remaining set of the more significant bits of each physical address, called a tag, along with the data. In a cache with indexing, an item with a particular address can be placed only within a set of lines designated by the index. If the cache is arranged so that the index for a given address maps exactly to one line in the subset, or ways, the cache is said to be direct mapped. If the index maps to more than one line in the subset, or ways, the cache is said to be set-associative. All or part of an address may be hashed to provide a set index that partitions the address space into sets.

With direct mapping, when a line is requested, only one line in the cache has matching index bits. Therefore, the data can be retrieved immediately and driven onto a data bus before the computer system determines whether the rest of the address matches. The data may or may not be valid, but in the usual case where the data is valid, the data bits are available on the data bus before the computer system determines validity. With set associative caches, the computer system cannot know which line corresponds to an address until the full address is compared. That is, in set-associative caches, the result of a tag comparison is used to select which line of data bits within a set of lines is presented to the processor.

In a cache with a TLB, the critical timing path for a hit requires a sequence of four operations: 1) a virtual tag must be presented to a CAM in the TLB to determine the location of a corresponding physical tag in random access memory (RAM) in the TLB; 2) the physical tag must then be retrieved from the TLB random access memory; 3) the physical tag from the TLB RAM must then be compared to the physical tag's access from the tag section of the cache; and 4) the appropriate data line must be selected. The sequence of four operations is required to read the cache and can be a limiter to processor frequency and processor performance.

SUMMARY

A prevalidated tag cache holds hit information from a translation lookaside buffer (TLB) instead of address information, as is the conventional practice. That is, when a virtual address is provided to the TLB, instead of a physical address being provided as an output from the TLB, TLB hit bits are provided. The TLB hit bits are then compared to the prevalidated cache tag (which holds the TLB hit information) to determine if a cache hit or a cache miss has occurred. The TLB may be small, for example 32 entries, to enhance processing speed. The TLB may be used for operations requiring lower latency, such as integer load operations.

The small TLB presents a potential problem of thrashing, i.e., swapping out pages, or TLB entries, for example, which will degrade the performance of the cache. Because the TLB is small, TLB entries may be removed very quickly, which effectively results in loss of data out of the cache. That is, the prevalidated cache tags include hit information of the TLB, and not physical addresses so that when a TLB entry changes, the hit information is no longer valid, and any data associated with the old TLB entry is lost.

In this micro-architecture, to keep the TLB entries small, and to prevent thrashing of the TLB, a separate and larger TLB may be added to process operations that can be handled with a higher latency, such as store operations. The larger TLB can also provide higher bandwidth for floating point operations, for example. TLB entries required to be in the small TLB may be restricted, for example to the TLB entries required for integer loads, while all other TLB entries are diverted to the larger TLB. The TLBs operate in parallel. Further, all exception and privilege checking may be performed in the large TLB, which also acts to reduce integer load access time. Use of this parallel TLB architecture has the added benefit of reducing pipeline stalls that might otherwise occur if the small and the large TLB were accessed in a series fashion.

As a further consequence of the cache tags having only TLB hit information instead of physical addresses, a mechanism may be provided to update and invalidate cache lines. For that mechanism, a parallel structure can be provided to lookup, update and/or invalidate cache lines separate form the mechanism of the small TLB and the integer load data path. In addition, in some situations, a data cache will be provided with just a physical address. To find the proper cache line, based on the physical address only, a control is provided that includes a tag having the physical address and physical address bypassing around the large TLB.

DESCRIPTION OF THE DRAWINGS

The parallel, distributed function translation lookaside buffer will be described with reference to following drawings in which like numerals refer to like elements, and in which.

DETAILED DESCRIPTION

A cache having a TLB in which physical tags do not need to be retrieved from the TLB may improve the overall time for the critical path for accessing caches with TLBs. In such a design, instead of storing physical tags in a cache, the cache stores a location within the TLB where the physical tag is stored. The TLB may include two or more CAMs. For a cache hit, one of the CAMs in the TLB may generate a vector that specifies a location within the TLB where the physical address is stored. The vector may be compared to a location vector stored in the cache. The comparison of location vectors provides sufficient information to enable selection of one data line within a set without having to actually retrieve the physical address. As a result, a substantial time consuming operation (physical address retrieval) is removed from the critical time path of a cache hit. In addition, comparing location vectors rather than physical tags enables use of comparison logic that is faster and simpler than convention digital comparators.

Figure 1:
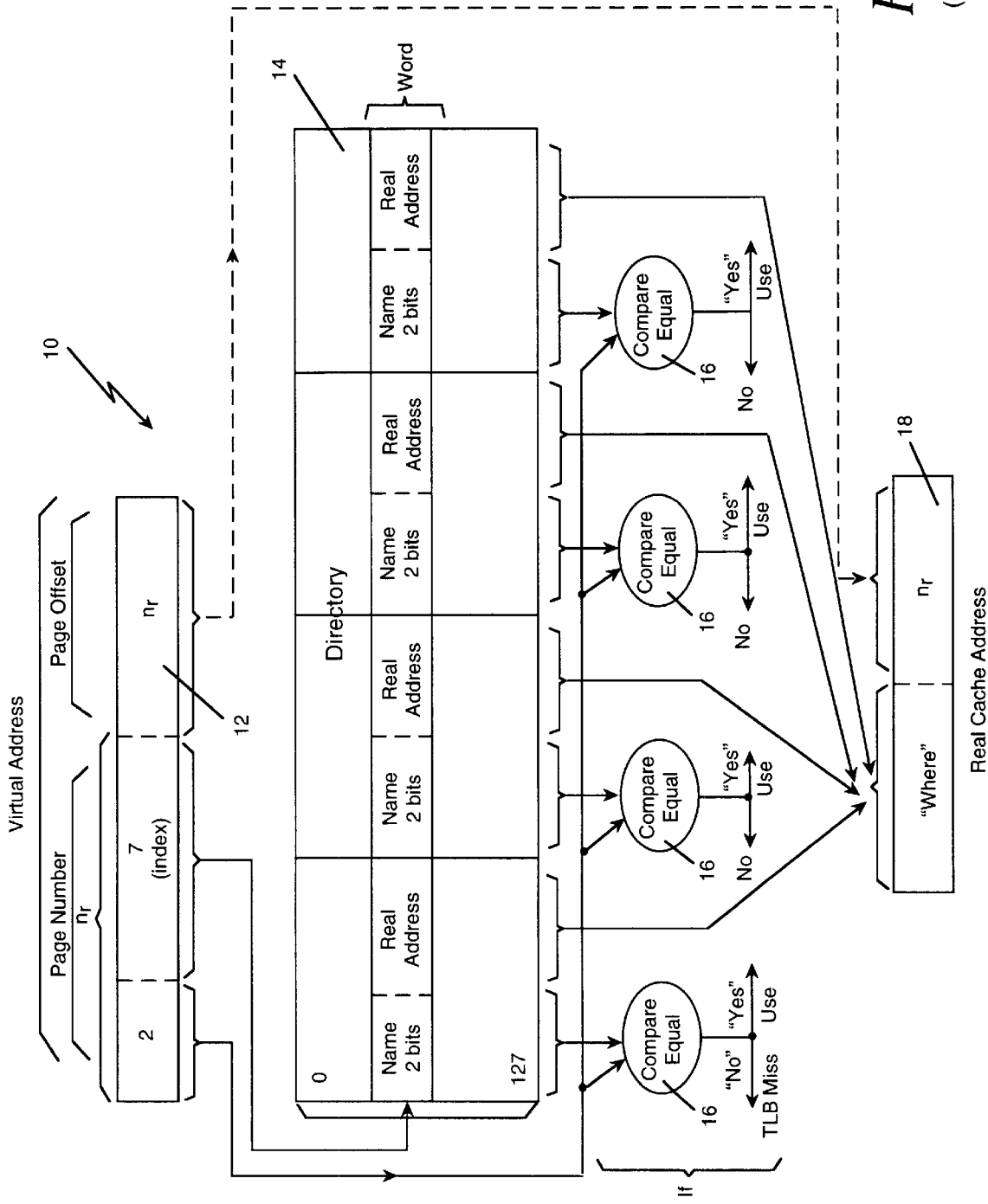
FIGS. 1 and 2 show prior art cache structures.

FIG. 1 illustrates an example of a prior art cache. The system 10 includes a virtual address 12, a random access memory array 14, a comparator 16 and a physical address register 18. The system 10 employs set associative logic. The random access array 14 includes a total of 128 (four) entries requiring two virtual page address bits. Each set of four is part of one physical word (horizontal) of the random access array, so that there are 128 such words, requiring seven address index bits. The total virtual page number address n=9 must be used in the address translation to determine if and where the cache page resides. Lower order bits n, which represent the byte within the page, need not be translated. Seven virtual bits are used to select directly one of the 128 sets. Words read out of the set are compared simultaneously with the virtual addresses, using the comparator 16. If one of the comparisons gives a "yes," then the correct real or physical address of the page in the cache, which resides in the random access array, is gated to the physical cache-address register 18. The physical address is used on a subsequent cycle to obtain the correct information from the cache array (not shown).

Figure 2:
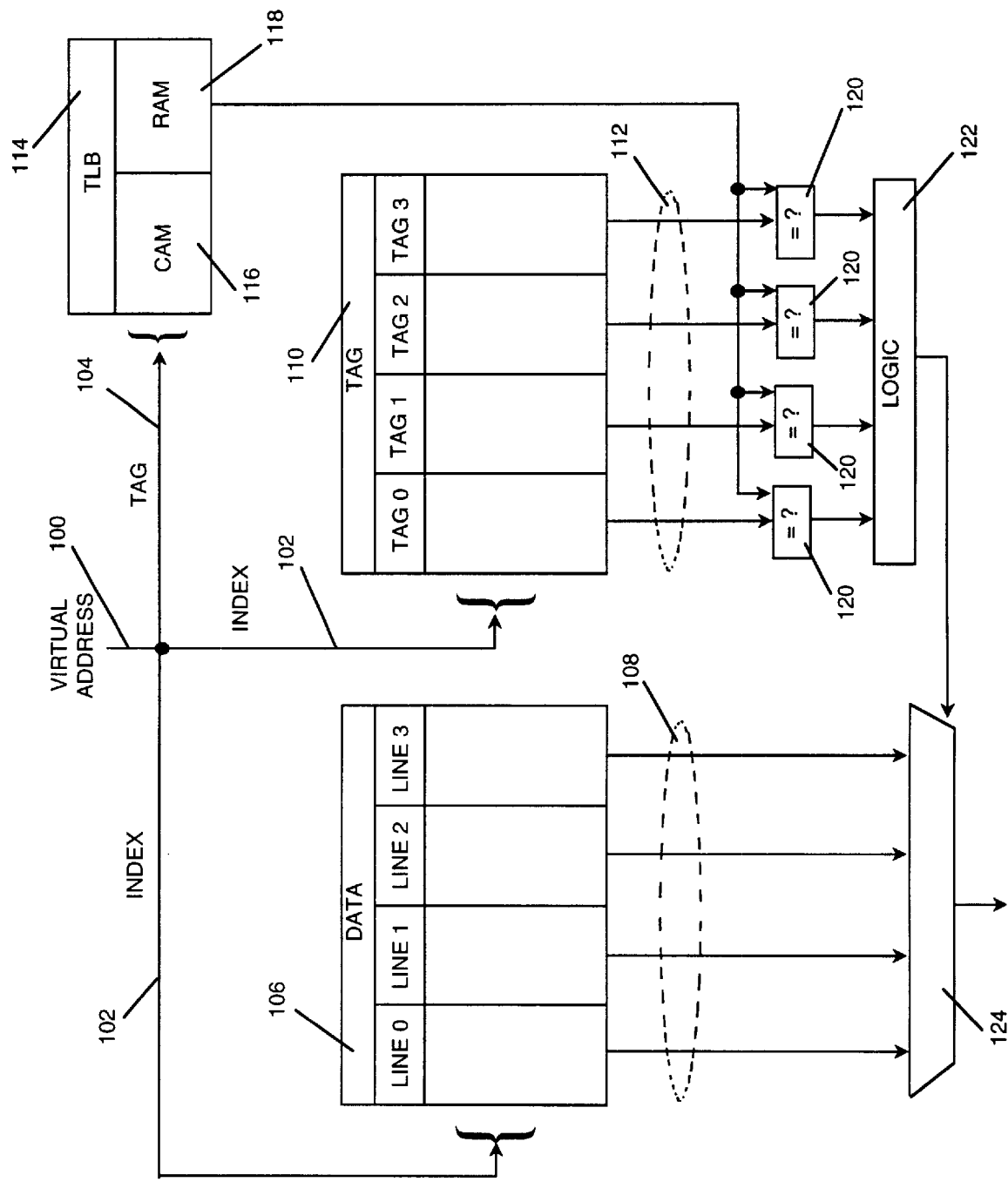

FIG. 2 illustrates another prior art cache. Four-way set-associative caches are used for illustration. A virtual address 100 comprises lower order index bits 102 and upper order (virtual) tag bits 104. The index bits 102 are typically the same for the virtual address and the physical address. The index bits 102 are used to select one set of lines of data in a data section 106 of the cache. The output of the data section 106 is four lines of data 108. The index bits 102 are also used to select a set of physical tags in a tag section 110 of the cache. The output of the tag section 110 is four physical tags 112, each corresponding to one data line 108. The virtual tag bits 104 are used to select one entry in a CAM 116 within a TLB 114. The TLB 114 stores both virtual and physical tags. If the virtual tag bits 104 do not find a match in the CAM 116, a TLB miss occurs. In the system shown in FIG. 2, multiple virtual tags may map to one physical tag. For a TLB hit, the selected CAM entry designates an address in a TLB RAM 118 for a physical tag corresponding to a virtual tag 104. A physical tag is then retrieved from the TLB RAM 118. Each of four digital comparators 120 then compares the physical tag from the TLB RAM 118 to a physical tag 112 from the tag section 110. A matching pair of physical tags indicates through logic 122 which of four lines of data is selected by a multiplexer 124. For a particular index bit, there may not be a matching pair of physical tags, in which case a cache miss occurs.

Figure 3:
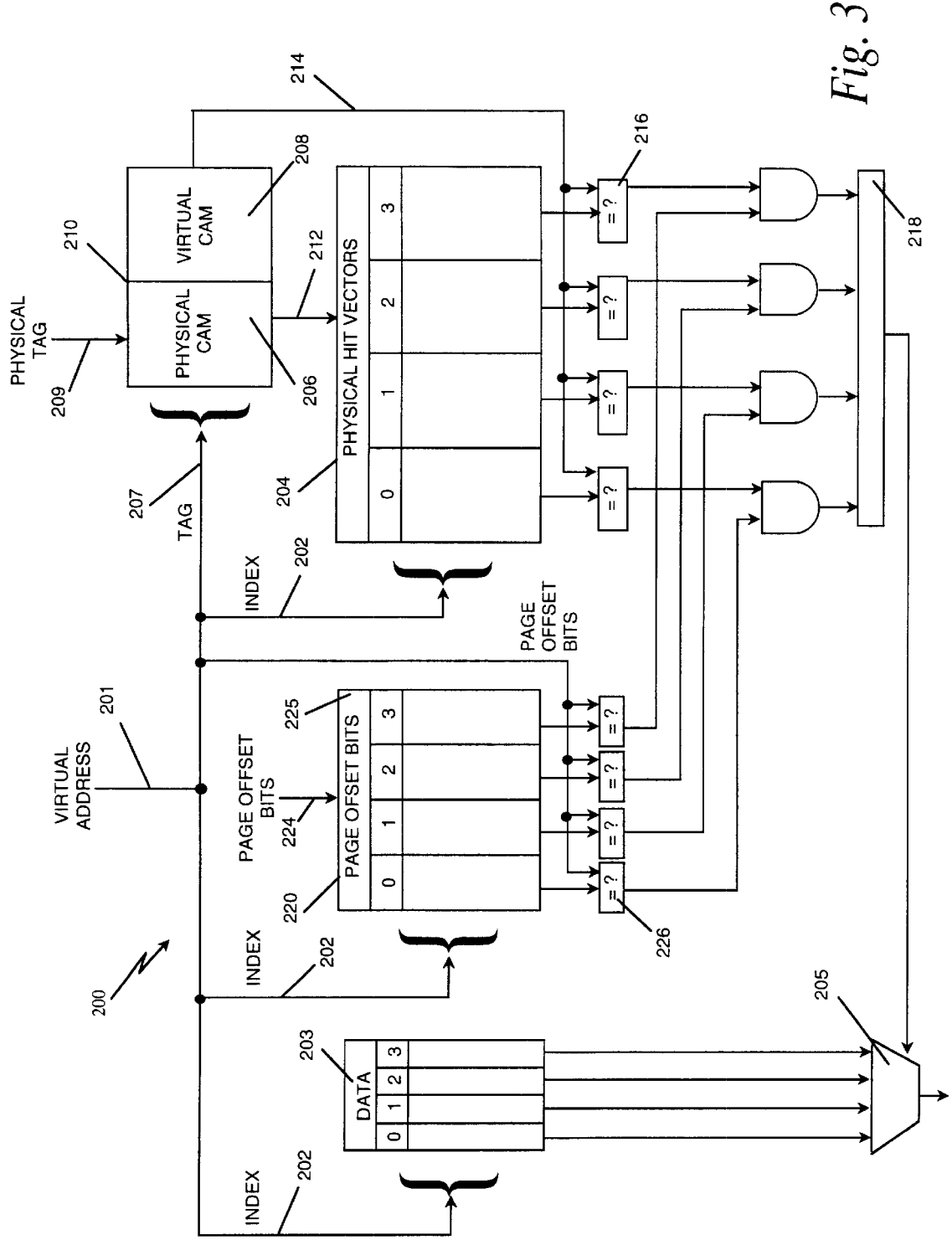
FIG. 3 illustrates a computer system having a prevalidated tag cache.

FIG. 3 illustrates a computer micro-architecture having a four-way set-associative cache 200. The cache 200 includes index bits 202, a data section 203 and multiplexer 205. A cache tag section 204 includes physical TLB hit tags corresponding to data lines. When a new line of data is placed in the cache 200, instead of the physical address tag being stored in the cache tag section 204, a vector 212 (called a physical TLB hit vector) is stored in the cache tag section 204.

Additional details related to prevalidated cache architectures are provided in U.S. Pat. No. 6,014,732, entitled CACHE MEMORY WITH REDUCED ACCESS TIME, the disclosure of which is hereby incorporated by reference.

In the cache 200, a TLB 210 has two CAMs, a physical CAM 206 containing physical tags and a virtual CAM 208 containing virtual tags. When a new virtual tag 207 is stored in the virtual CAM 208, a corresponding physical tag 209 is also available using the computer operating system and the corresponding physical tag 209 is stored in the physical CAM 206. A physical TLB hit vector 212 has a binary "1" corresponding to each location in the physical CAM 206 that has the physical tag 209. Upon entry of a new line into the cache 200, the physical TLB hit vector 212, indicating the location of all the instances in the physical CAM 206 of the physical tag 209 of the new line, is generated by the physical CAM 206 and stored into the cache tag section 204, at a row location determined by the index bits 202 and at a column location determined by a set placement algorithm.

For a cache access, a virtual tag 207 is used by the virtual CAM 208 to generate a virtual TLB hit vector 214. If there is a TLB miss, the virtual TLB hit vector 214 is all binary "0s." If there is a TLB hit, the virtual TLB hit vector 214 has a single binary "1" indicating the location of the virtual tag 207 in the virtual CAM 208. Each virtual tag 207 in the TLB 210 must be unique.

For cache access, the index bits 202 select a set of four physical TLB hit vectors 212 in the cache tag section 204. Each of the four physical TLB hit vectors 212 in the cache tag section 204 is compared, using one of four comparators 216, to the virtual TLB hit vector 214 from the virtual CAM 208. For any given set of index bits 202, only one of the four selected physical tags in the cache tag section 204 matches the virtual TLB hit vector 214 from the TLB 210 for a fixed page size. For a fixed page size, a single pair of matching "1s" in the four physical TLB hit vectors 212 then determines which data line is selected by the multiplexer 205. For a given set of index bits 202, if there are no matching "1s" in the compared four physical TLB hit vectors 212, a cache miss occurs.

In the cache 200, the physical tag from the TLB 210 is not retrieved for cache access. Eliminating the operation of retrieving the physical tag from the TLB 210 substantially reduces the amount of time in the critical time path for the cache access. Because the cache 200 looks for a pair of matching logical "1s" to determine a match, the comparators 216 may be simple AND gates followed by a large fan-in OR gate.

The micro-architecture illustrated in FIG. 3 includes a prevalidated tag cache. The prevalidation imposes restrictions on how the TLBs in the micro-architecture work if the computer micro-architecture designer wants to maximize overall bandwidth while minimizing cache load latency. The prevalidated tag cache, for example, provides very fast access time for certain loads but the micro-architecture designer may choose to restrict the translations between virtual and physical addresses and restrict the distribution of processing among the different cache levels. The micro-architecture may provide for fast integer loads and a high bandwidth for floating point loads, for example. That is, integer load data needs to have fast access timing but its working set size is generally small. To optimize integer load latency, some processors provide a small but fast first level cache. To provide virtual address translation and avoid address aliasing problems, some processors must access the TLB to provide a physical address for checking with the cache tags to determine if the data is present in the cache or not. To decrease the memory latency for fast integer data access, TLB size may be limited to a small number of entries (such as 16 to 32). This conflicts with the large number of entries required on processors with large cache structures that could require 256 or more TLB entries.

In a prevalidated cache tag system, such as that shown in FIG. 3, the TLB entries are logically used in the cache tag to identify the cache lines. When a TLB entry is removed, control is normally used to invalidate all the data in the prevalidated cache tag that is associated with the removed TLB entry. However, this action may slow processing since one TLB entry may map to much or all of the data cache. The TLB may then be continually swapping pages in and out of memory (i.e., thrashing) instead of supporting program execution.

Floating point data processing performance is usually limited by the memory bandwidth in and out of the floating point execution units. As opposed to integer load data accesses, which need a low latency, floating point accesses can usually be scheduled and can therefore endure a longer latency period. Likewise, while the integer data size is usually small, floating point data sets are usually very large. Ideally, TLB operations for floating point load/store operations will provide both high bandwidth and large data space translations (large number of TLB entries accessed). One design provides full bandwidth for all memory ports and a large but slower TLB for translation of floating point requests. In addition, memory port use may be unrestricted, allowing more load and store combinations.

The storing to or invalidating of a prevalidated integer load data cache may be difficult because the physical address of the cache line is not available in the cache tag, since the cache tag only holds prevalidated TLB hit information. In addition, since the TLB by its need for fast latency is small (e.g., 16 or 32 entries), the small integer load data cache TLB may not be used for store translations. One option is to separate out the store TLB access to a larger and slower TLB and provide a mechanism to invalidate the prevalidated integer load cache for store operations that may not be done in the first level cache (such as floating point stores) and for other invalidation actions such as flush caches and bus snoops.

Many computer instructions, such as floating point loads and stores, TLB support instructions, including purges, inserts and probes, and integer stores, do not need to immediately access a fast integer data cache. Some of the computer instructions may not have data residing in the fast integer load cache, to avoid thrashing of the smaller cache. To support better use of the fast integer data cache, mechanisms may be provided to prevent this type of data from loading the integer data cache. To allow these instructions to bypass the integer cache, all exception information may be stored only in a large TLB so that the large TLB need only be accessed on, for example, all store operations, floating point loads, or TLB support instructions, including TLB reference (read) and update instructions.

Finally, forcing all instructions through a first level TLB, which must be small to be fast, may cause pipeline stalls in the processor due to a higher TLB miss rate. Therefore, the micro-architecture shown in FIG. 3 may be adapted to use a parallel TLB structure that reduces the TLB miss rate and pipeline stalls.

Figure 4:
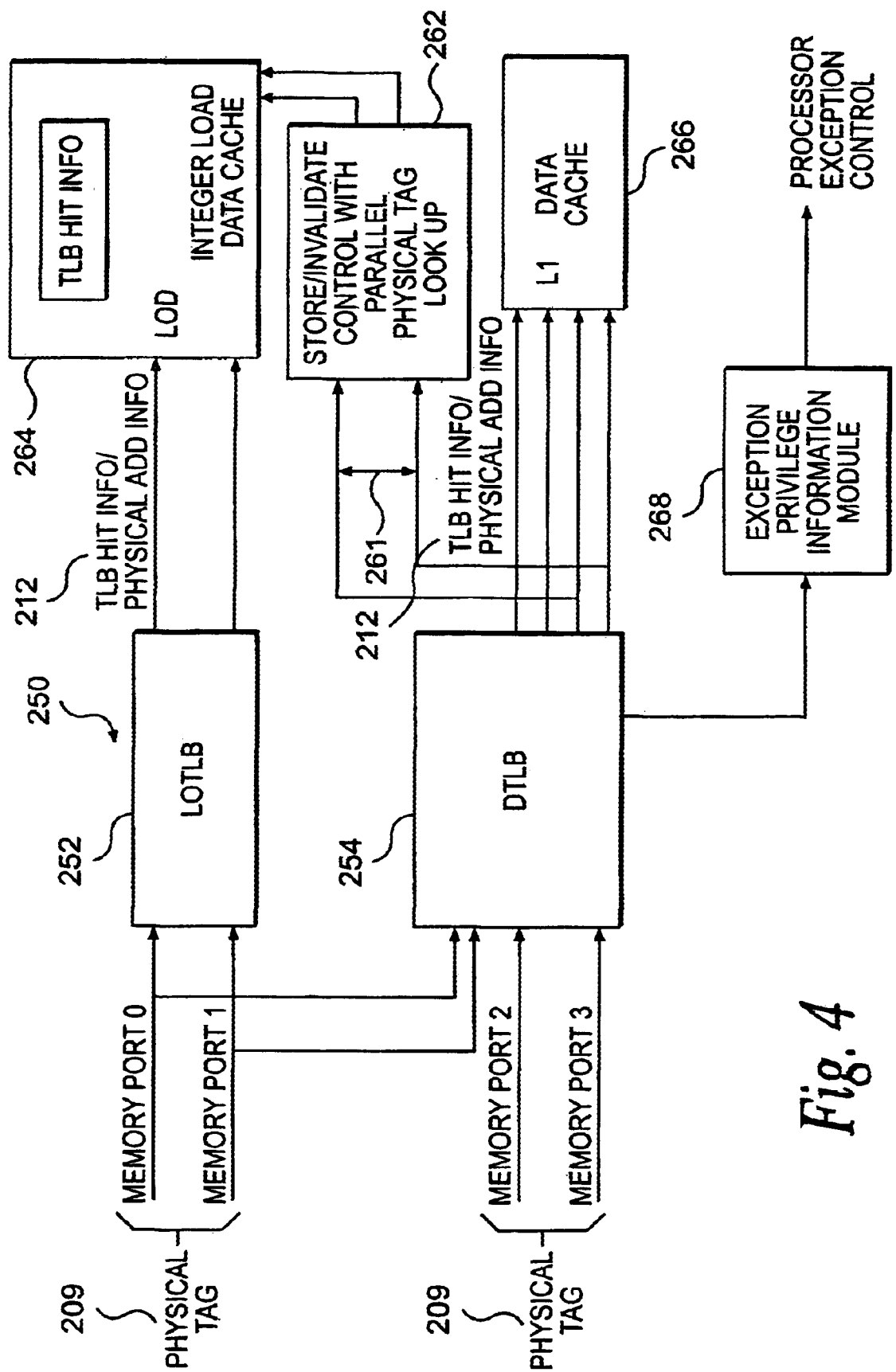
FIG. 4 shows a parallel distributed translation lookaside buffer structure for use with the prevalidated tag cache of FIG. 3.

FIG. 4 illustrates a computer micro-architecture 250 employing a parallel, distributed function TLB structure. The computer micro-architecture 250 provides efficient use of a small TLB for fast integer load data access by not thrashing the small TLB with entries needed by instructions that are not integer load instructions. The micro-architecture 250 reduces cache data invalidation for prevalidated cache tag designs by reducing thrashing in the small TLB and provides a reduced memory port bandwidth to make the design smaller and faster for the small (integer load data) TLB. The micro-architecture 250 provides a larger TLB to handle large data structures, such as floating point applications, which reside in larger caches, and provides a high bandwidth TLB to handle high bandwidth needs of floating point applications. The micro-architecture 250 also provides a way to process store and invalidation request translations without disrupting the fast integer data caches. Finally, the micro-architecture 250 provides a single location for exception and protection control for addressing, which is separate from the small TLB in the integer load data cache.

The LOTLB 254 receives physical tags 209 from memory ports 0 and 1, and outputs TLB hit information and physical address information 212 to the LOD 264. The DTLB 254 receives physical tags 209 from memory ports 0–3, and outputs TLB hit information and physical address information 212 to the L1 data cache 266.

The computer micro-architecture 250 includes parallel TLBs, an integer load data TLB (LOTLB) 252 and a master TLB (DTLB) 254. The micro-architecture 250 also includes an integer load data cache (LOD) 264, a L1 data cache 266 and a store/invalidate with parallel physical tag look up control 262. As shown in FIG. 4, the TLBs are accessed through four memory ports 0–3. However, the micro-architecture 250 is not limited to this configuration, and any number of memory ports may access the TLBs.

The LOTLB 252 is designed to provide a short latency for integer load data. To accomplish this, several restrictions are placed on the LOTLB 252. In the example shown in FIG. 4, only two of the four memory ports are allowed to access the LOTLB 252 in order to reduce the size and complexity of the LOTLB 252 and therefore increase its speed. The reduction is possible by assigning integer loads only to two of the four memory ports. Furthermore, integer store instructions do not access the LOTLB 252, but are handled in the DTLB 254. This arrangement allows the micro-architecture 250 to allocate load-only TLB entries in the LOTLB 252, reducing thrashing of TLB entries, and has, in a prevalidated tag cache design, the side effect of invalidating cache lines.

Next, floating point loads and stores and other miscellaneous TLB access instructions may not access the LOTLB 252, reducing thrashing of TLB entries in the LOTLB 252. Floating point accesses are handled by the L1 data cache 266 and are translated through the DTLB 254.

Exceptions and protection information is not included in the LOTLB 252, allowing a smaller and faster design. An integer load instruction may have an entry in both the LOTLB 252 and the DTLB 254 for a valid cache hit to be processed, due to the exception and protection information residing only in the DTLB 254. Finally, a path is provided from the LOTLB 252 to the LOD 264 to look up all integer load instructions to determine cache hits.

The DTLB 254 is designed to provide a large number of TLB entries and high bandwidth with a higher latency than in the LOTLB 252. The DTLB 254 provides parallel ports for all TLB accesses to provide high bandwidth to support the execution of four memory operations per cycle. However, as noted above, the micro-architecture 250 is not limited to four memory ports. The DTLB 254 also provides general memory ports so that each memory port can service either loads or stores. Because the LOD 264 may be restricted to two loads or two stores per cycle to provide fast latency, the DTLB 254 allows execution of up to four floating point loads or four floating point stores per cycle.

The DTLB 254 provides exception and protection information for all four memory ports. This allows the LOTLB 252 to be constructed without this information so that the LOTLB 252 can be smaller and faster. The DTLB 254 provides a translation path to the integer data path for store address updates and cache line invalidation functions. Finally, the DTLB 254 provides a path to the L1 data cache 266 to perform cache lookups for all floating point load and store operations.

In the micro-architecture 250, integer store update addresses and invalidation addresses may be provided to the LOD 264. The control 262 allows the micro-architecture 250 to store physical addresses of a cache line in parallel with a prevalidated cache tag entry. In addition, a path 261 is provided from the DTLB 254 to the integer data path for store updates and store invalidations. The DTLB 254 address is compared to all ways of associativity in the physical address cache tag structure to detect which ways of associativity match the current store or invalidation request. The control 262 allows the prevalidated tag cache LOD 264 valid status to be updated for invalidation requests and updates the integer load data cache for integer store operations. Finally, an exception information module 268 receives exception information from the DTLB 254 for all four memory ports 0–3.

The foregoing description of the parallel, distributed function translation lookaside buffer is presented for purposes of illustration and description. The description is not intended to be exhaustive or to limit the invention to the precise form disclosed, and other modifications and variations may be possible in light of the above teachings. The description explains the principles of the parallel, distributed function translation lookaside buffer and its practical application to allow others skilled in the art to best use it in various embodiments and modifications as are suited to the particular use contemplated.

What is claimed is:

1. A computer micro-architecture, comprising:
 a first translation lookaside buffer (TLB), the first TLB adapted to receive first data; and
 a second TLB in parallel with the first TLB, the second TLB adapted to receive the first data and to receive second data in parallel with receipt of the first data in the first TLB, wherein the first TLB is accessed by a first and a second memory port, and wherein the second TLB is accessed by the first and the second memory ports and by a third and a fourth memory port.

2. The computer micro-architecture of claim 1, wherein the first data consists of integer load data.

3. The computer micro-architecture of claim 1, wherein the second data comprises one or more of integer store data, floating point load or store data, and TLB reference and update instructions.

4. The computer micro-architecture of claim 3, wherein the second data further comprises integer load data for exceptions and cache misses.

5. The computer micro-architecture of claim 1, further comprising a first cache, wherein the first TLB provides TLB hit information based on the received first data and wherein the first cache holds the TLB hit information.

6. The computer micro-architecture of claim 1, further comprising a second cache, wherein the second TLB provides physical address information, and wherein the second cache holds the physical address information.

7. The computer micro-architecture of claim 1, further comprising a control that holds physical addresses of prevalidated cache tag entries.

8. The computer architecture of claim 1, wherein the second TLB stores exception and privilege information.

9. In a computer micro-architecture having a prevalidated tag cache, a translation lookaside buffer (TLB) structure, comprising:

an integer load TLB;

a master TLB operating in parallel with the integer load TLB, wherein integer loads are supplied to the integer load TLB and loads and stores are provided to the master TLB;

an integer load data cache that receives an output from the integer load TLB; and a data cache that receives an output from the master TLB, wherein the integer load TLB provides TLB hit information based on a virtual address and the integer load data cache stores the TLB hit information, and wherein the master TLB provides physical addresses to the data cache and the data cache holds the physical address.

10. The TLB structure of claim 9, wherein the integer load TLB is accessed by first memory ports and the master TLB is accessed by the first memory ports and by second memory ports.

11. The TLB structure of claim 9, further comprising a store update and invalidate control coupled to the master TLB and the integer load data cache, the store update and invalidate control providing an update or invalidation signal for cache lines in the integer load data cache.

12. The TLB structure of claim 9, further comprising an exception and privilege information module, wherein the master TLB receives exception and privilege information.

\* \* \* \* \*